April 27, 1954 R. G. LOHRE ET AL 2,676,633
ABRADING APPARATUS FOR REMOVAL OF FRUIT SURFACES
Filed July 5, 1950 3 Sheets-Sheet 1

INVENTORS:
RALPH G. LOHRE
JOSEPH L. PITZER.
BY

ATTORNEYS.

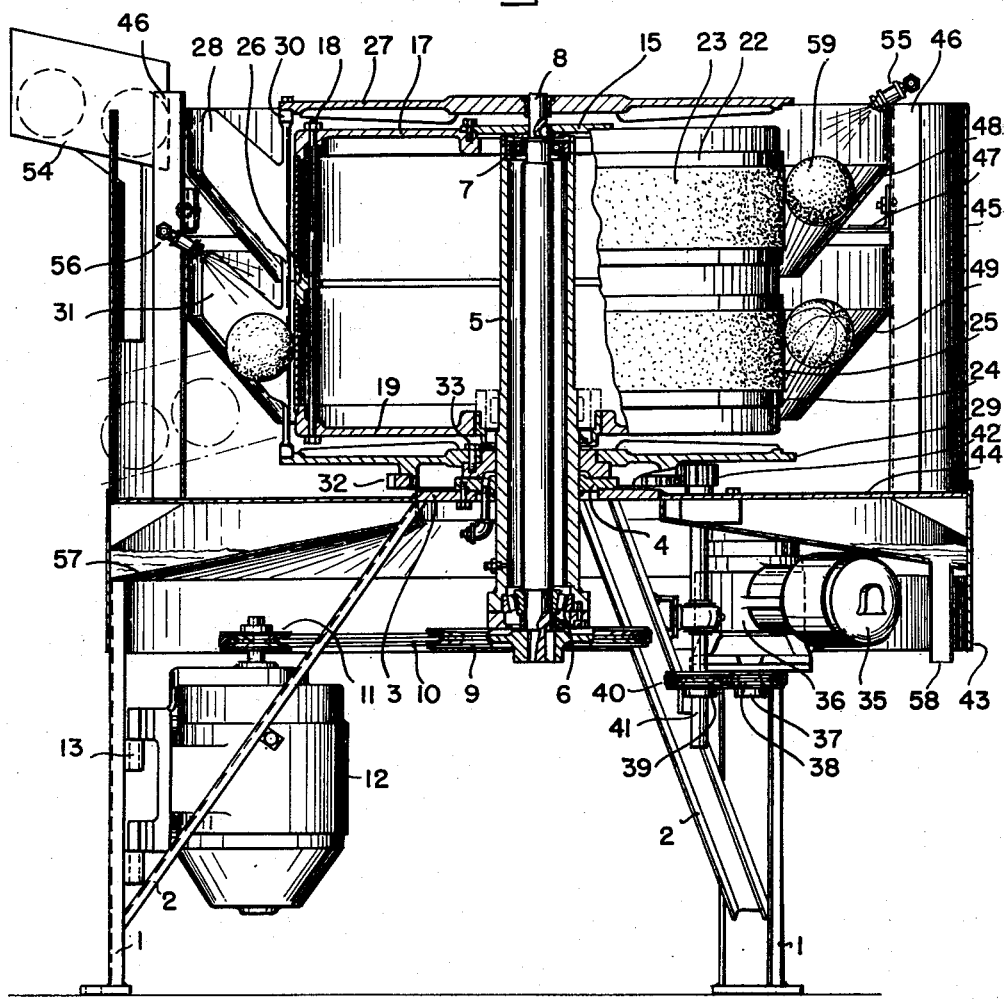

April 27, 1954  R. G. LOHRE ET AL  2,676,633
ABRADING APPARATUS FOR REMOVAL OF FRUIT SURFACES
Filed July 5, 1950  3 Sheets-Sheet 3
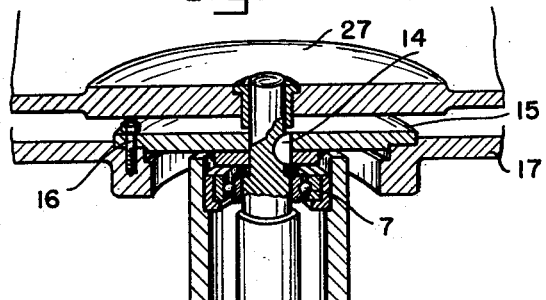
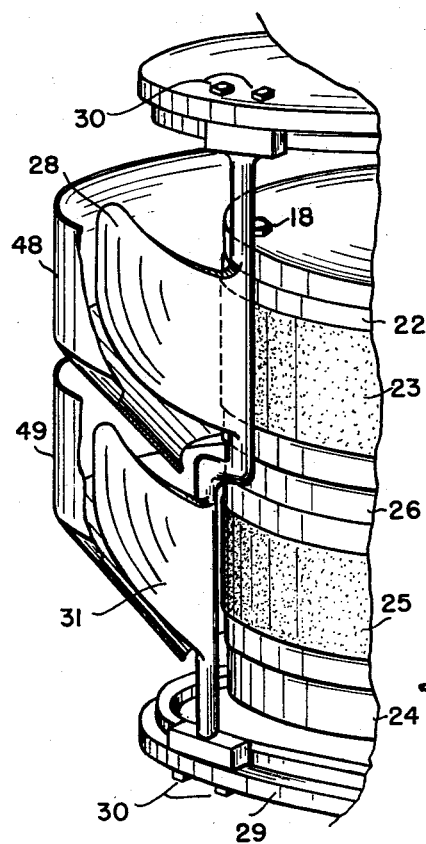
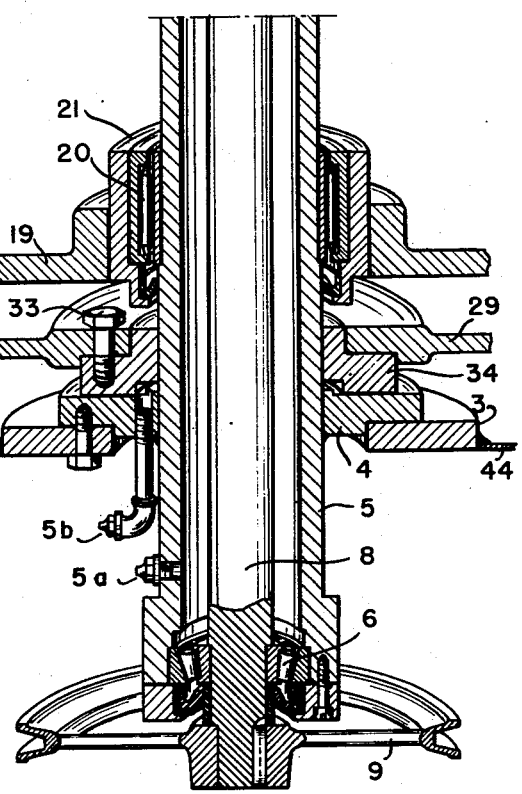
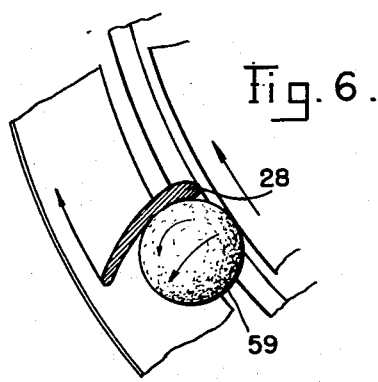
INVENTORS:
RALPH G. LOHRE
JOSEPH L. PITZER.
BY
ATTORNEYS.

Patented Apr. 27, 1954

2,676,633

UNITED STATES PATENT OFFICE 2,676,633

ABRADING APPARATUS FOR REMOVAL OF FRUIT SURFACES

Ralph G. Lohre and Joseph L. Pitzer, Dunedin, Fla., assignors to Extraction, Inc., Dayton, Ohio, a corporation of Delaware Application July 5, 1950, Serial No. 172,161

1 Claim. (Cl. 146—49)

This invention relates to an apparatus and method of removing the skin, hide and other coverings on various types of articles, particularly fruit, vegetables and the surfaces of inedible materials.

It is an object to provide an apparatus and a method of rapid removal of the exterior of the articles being worked upon and to dispose of the refuse continuously in order to continuously clean the surface of the articles being treated.

In particular this machine and method is adapted to the treatment of citrus fruits where it is highly desirable to remove the outer yellow covering in the flavedo which contains peel oil and other materials as well as bacteria, enzymes and other undesirable materials which should be kept from the juice of the citrus fruit.

It will be understood that this machine in the citrus fruit industry is used for the purpose of removing the outer yellow covering of the citrus fruit so that when the fruit is ultimately compressed to extract the juice, the juice will be free of bacteria, enzymes, peel oil and other chemical products on or in the outer surface of the citrus fruit.

Upon accomplishing this objective, the citrus fruit will be substantially clean, having washed the exposed albedo of the fruit. The problem involved is to remove this outer yellow covering with the peel oil and bacteria and at the same time not injure the fruit or bruise it. It is also necessary to do so at high speeds for reasons of economy and it is necessary to wash away the refuse in such a manner that the solids can be recovered for stock or human consumption as food and the water and peel oil that is entrained with water can be used in a recovery process for recovering the peel oil which is a substance of very substantial value.

It is therefore an object of the invention to pass the fruit through the machine by continually rotating the fruit on all of its axes in order to uniformly remove the outer covering of the fruit; to permit the weight of the fruit to adjust the pressure against the abrading mechanism to prevent any injury to the fruit; to cause the fruit to be rotated and simultaneously abraded by the rotating abrader; to move the fruit in controlled batches so that the fruit is continually engaging one another in order to cushion the movement of the fruit to reduce any injury to the fruit; and likewise to cause the fruit to press against the controlling fingers in order to regulate the action of the abrader upon the fruit, and to prevent excessive feed of the fruit as caused by the abrader, which would not only injure the fruit, but remove an excess amount of exterior material on the fruit or cause the fruit, because of its resiliency, to jump out of the machine.

It is a further object of this invention to provide an abrader traveling at a given speed, relatively fast, and a series of retaining fingers for controlling the fruit in batches as it passes through the machine in engagement with the abrader so as to regulate the relative speed by the slower moving fingers to the faster moving abrader which in turn results in the fruit being rotated in all directions on all axes for uniform removal of the exterior covering of the fruit.

It is a further object to provide a supporting truck, diagonally disposed with respect to the abrader, so as to support the fruit in wedging engagement with the abrader, thereby utilizing the weight of the fruit to control the extent to which the fruit automatically engages the abrader.

It is a further object to provide the controlling fingers to resist the forward movement of the fruit by reason of the action of the faster moving abrader against the fruit, and by this series of fingers to segregate the fruit in batches, although the fruit is moving generally in a continuous procession through the machine, to prevent congestion and jamming of the fruit and its injury.

It is a further object to produce the fruit in successive circular paths one above the other so that the fruit may pass from one abrader treatment to a lower stage where it engages with another type of abrader treatment in order to adjust the abrasion according to the character of the fruit.

It is a further object to provide water sprays for continuously spraying water or other liquids upon the fruit to wash away the refuse, the peel oil and the like as well as the bacteria, and clean the abrasive surfaces.

It is an object to permit the individual pieces of fruit to abut one another as they are resilient, to bounce upon one another and to variably press against one another thereby causing the fruit to assume different positions and as a result of engagement of the abrasive material with the fruit, the fruit moves on all axes to present all surfaces to the abrading medium so that the surface of the fruit is uniformly removed down to the albedo. Only sufficient peel oil remains to constitute a fraction as little as .003 in the juice ultimately extracted from the fruit.

It will be understood that it has heretofore been impossible to avoid the introduction of enzymes and bacteria as well as peel oil into the juice pressed from the fruit, but by this machine and its method it is possible now to eliminate this great hazard to citrus concentrates. The presence of the bacteria frequently results in the formation of gels and the ruining of the concentrates on the shelf.

Referring to the drawings:

Figure 3 is a vertical side section illustration of Figure 1.

Figure 4 is a sectional view taken along line 4—4 showing a close-up of the retaining fingers.

Figure 5 is a section on the line 5—5 of Figure 1 looking in the direction of the arrows. This section is partially perspective in order to indicate the relative position of the driving mechanism for the faster abraders and the slower retaining fingers.

Figure 6 is a diagrammatic view showing in detail, with one of the fingers in section, the position of the supporting track, the retaining finger and the abrader.

Figure 2:
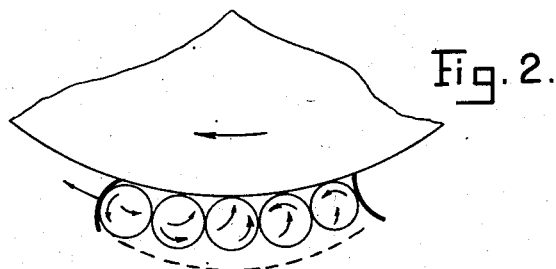
Figure 2 is a diagrammatic view indicating the movement of the fruit and their relative movement in the same direction of the moving retaining fingers and the abrader.

Referring to the drawings in detail, 1 designates a plurality of vertically disposed legs. Numeral 2 indicates diagonal braces extending upwardly and inwardly above the tops of the legs to furnish a support for the center plates 3 which in turn support the bottom ring 4 that is welded to the vertical tube 5. This tube 5 is provided with lowered tapered bearings 6 and upper ball bearings 7 which act as the guide and support for the shaft 8. The shaft has attached to its lower end the driving pulley 9, which travels at a rate of approximately 400 R. P. M. (the exact speed depends upon the type of machine being employed and the kind of materials being processed), which pulley 9 is driven by a belt 10 from a pulley 11 mounted on the armature shaft of the motor 12 which is mounted upon the bracket 13 upon one of the legs 1.

The shaft 8 is connected by a key 14 at its top to an attaching plate 15 which is bolted by the bolt 16 to the top cover 17 of the abrader assembly. This top cover is connected by outer bolts 18 to a bottom plate 19 which in turn is mounted upon needle bearings 20 in a housing 21 upon the exterior of the tubes 5. Between the upper and lower plates 17 and 19 there is a clamped abrader drum 22 with an abrasion material 23 on the surface thereof and drum 24 with abrasive material 25 thereon, such drums being separated by a separator ring 26. These drums are clamped against the separator ring by the action of the bolts 18 operating upon the upper and lower clamping plates. The plate 15 that is keyed to the shaft 8 rests upon the upper ball bearing 7 optionally or the ball bearing 7 may be employed only for maintaining the vertical position of the shaft 8. The load is taken upon the thrust bearing of paper roller type designated 6. They are located at the bottom of the tube 5. It will be noted that the top of the shaft 8 is provided with a reduced portion that is inserted in the upper supporting plate 27 for the control fingers 28.

At the bottom there is a second plate 29 which is connected by the bolts 30 on which are mounted the control fingers 28 in the upper tier and 31 in the lower tier. This lower plate 29 is bolted to the ring gear 32. It is also bolted by the bolt 33 to the collar 34 which in turn is mounted upon the sleeve 5.

The motor 35 drives the speed transmission mechanism 36, the shaft to which 37 carries the pulley 38 which in turn supports the belt 39 that drives the pulley 40 on the vertically disposed shaft 41 which has on its upper end the pinion 42 meshing with the gear 32. This is the ring gear that is attached to the plate 29 which in turn supports the control fingers 28 and 31. While the speed of these fingers varies, yet it has been found satisfactory to have them travel approximately 6 R. P. M. as contrasted with the abrader drum traveling at 400 R. P. M. By adjusting the speed reducer it is possible to control the exact speed at which these fingers will travel in their rotating paths about the axis of the machine. The shaft 41 is mounted in a bracket on one of the diagonal braces 2.

According to the sheet metal work housing and supports, the vertically disposed sheet metal drum 43 which is mounted upon the legs 1 has a cover forming a bottom for the machine and designated 44. This cover is connected at the center of the machine by welding to the plate 3. Mounted upon this bottom 44 is a cylindrical outer drum 45. Within the outer drum 45, and mounted upon the bottom 44 are a plurality of vertical standards 46 which serve as support for the tracks which are disposed interiorly of these vertical supports 46. The inner tracks are carried upon a bracket 47 and are designated respectively 48 and 49. These tracks are not continuous in order to permit the fruit to drop downwardly when the end of the track is reached but cannot pass over to the adjacent end. For instance, the entering hatch of the upper track 48 is designated 50, while the exit edge is designated 51. This enables the orange or other fruit after having made its circuit in engagement with the abrader upon the track to pass from the upper track 48 to the lower track 49 for engagement with the lower abrader. Likewise, after a second circuit has been made in engagement with the lower track 49 and the lower abrader 25, fruit then drops through the opening in the lower track 49 indicated at 52. The orange then makes its exit through the chute 53.

It will be noted that the fingers, acting as control fingers 26 and 31 in the respective upper and lower series are offset with reference to one another so that the lower series are slightly advanced over the upper series. This is illustrated plainly, particularly in Figure 1.

The fruit enters through the passageway 54, dropped down upon the upper tracks 48, engages the abrader 23, and engages one of the fingers 28 or one of the adjacent pieces of fruit controlled by the upper fingers 28. There is also provided a water spray 55 of which there is a plurality spraying water upon the fruit and the abrading surface 23 to keep it clean and free of refuse material. There is also provided a series of water nozzles 56. As these nozzles spray water upon the moving control fingers 28 and 31, upon the inclined surfaces of the tracks 48 and 49, upon the fruit, and upon the abrading surfaces 23 and 25, the machine is kept not only clean and free of refuse, bacteria, enzymes, oil and the like, but the refuse material then descends into the trough formed by the bottom pans designated 57, hence the water and the refuse makes its exit through the port 58. At this point the refuse is separated from the water and peel oil, the latter being distilled from the water in the usual manner.

It will be observed that the tube 5, can act as a reservoir for the bearings 6 and 7 and can be filled with oil or grease through the ports 5a. Likewise, lubrication of the exterior of the tubes 5 can be controlled by lubrication through the port 5b.

Method of operation

Figure 1:
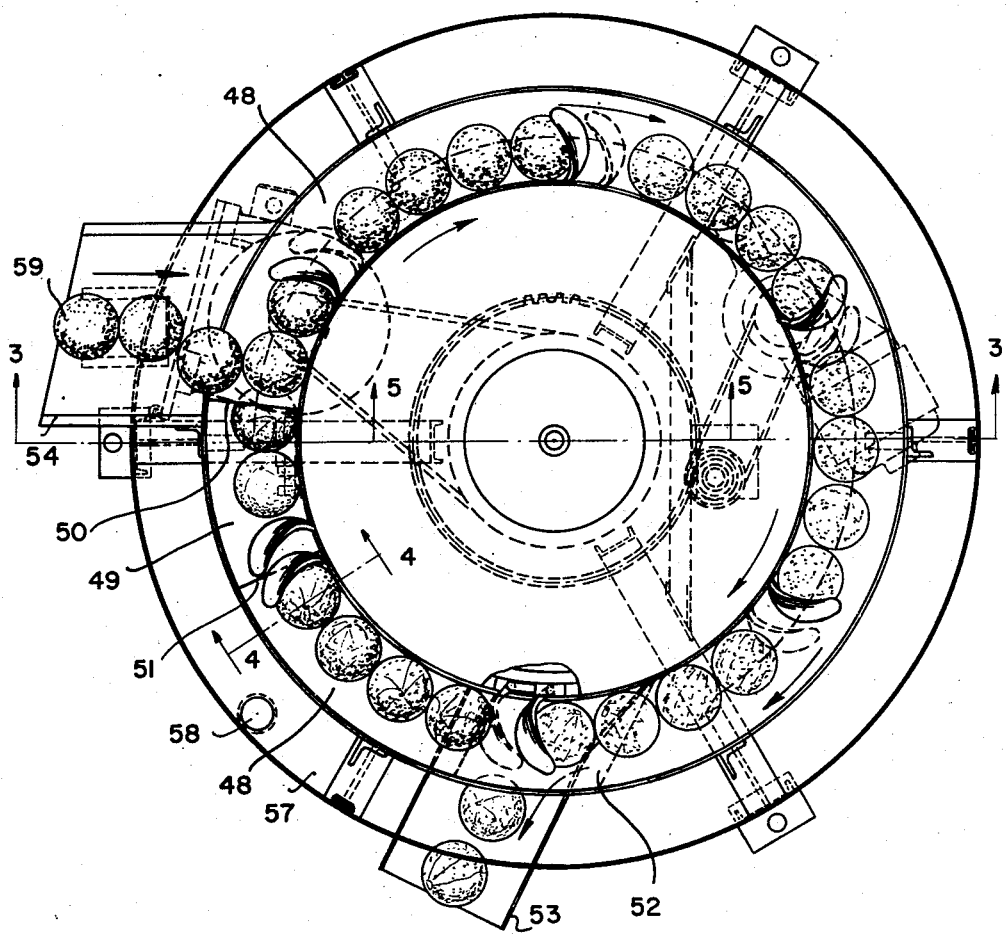
Figure 1 is a diagrammatic top view of the machine of this invention.

Turning to Figure 1, the oranges or other citrus fruit or articles to be treated are designated 59. They enter one-by-one onto the track 48. As the abrader 23 is traveling much faster than the control finger 28, the fruit is kept against the back of the finger 28, and at the same time, due to being supported upon the downwardly and inwardly tapering tracks 48, it is caused to rotate on all of its axes. This is facilitated by the introduction by the next succeeding orange or piece of fruit. Between fingers there are customarily from four to six pieces of fruit which are bouncing and jumping against one another and engaging one another to cause further rotation as they rotate so that the pieces of fruit are moving in all directions in order to uniformly abrade the exterior of the fruit. In the case of oranges, grapefruit, limes and lemons, the exterior oil bearing cells of the flavedo are worn away. By adjusting the speed of the abrader, the character of the abrading surface and the relative speed of the control fingers, the angularity of the tracks 48 and the various adjustments can be effected for removing this exterior portion of the fruit, the water sprays 55 continually washing away the abraded particles not only from the fruit, but from the face of the abrading strip 23. This strip may be continuous or intermittent depending upon the type of abrasion to be desired.

The fruit then drops one-by-one onto the second track 49 where the abrasion takes place against the lower abrading strip 25, and the movement of the fruit is controlled by the control fingers 31. These fingers are offset slightly in advance of the upper fingers. Here again the same operation is repeated so that the refuse is carried away out of the water sprays 56 into the lower pan 57 and thence out through the passageway 58. The fruit itself is then discharged to the discharge port 53. The operation of the machine is continuous. Due to the tapered supports 48 and 49, the fruit adjusts itself irrespective of its size to its appropriate position on the base of the abraders 23 and 25. Therefore all sizes of fruit can be accommodated automatically and it is unnecessary to make size selection before introducing the fruit in the machine.

Hereinafter there is set forth the claim which is deemed to cover this invention, but it is understood that various modifications of construction and method may be employed in order to achieve the ultimate result and still remain within the scope of this claim. Such variations are comprehended within the meaning and scope of the language employed in defining this invention.

We claim:

In an abrading machine; a frame, a vertical sleeve mounted in said frame, a shaft extending through and journaled in said sleeve, a motor for driving said shaft, a drum in the frame coaxial with said sleeve and connected at its upper end with said shaft and being journaled at its lower end on said sleeve, a plate on the shaft above the drum and a plate journaled on the sleeve below the drum, rods extending axially of the drum about the periphery thereof and connecting said plates, outwardly and upwardly extending restraining fingers mounted on said rods, a motor for driving the lower of said plates whereby the plates, rods, and fingers rotate in unison, a downwardly convergent conical shelf surrounding the drum at the level of each of the said fingers, said drum comprising annular bands of abrading material at the levels of said shelves, feed means to introduce fruit to the upper shelf between the adjacent fingers, means to deliver the fruit from the upper shelf to the lower shelf after the fruit has made substantially a complete circuit of the upper shelf, and means for discharging the fruit from the lower shelf after it has made substantially a complete circuit thereof.

References Cited in the file of this patent

UNITED STATES PATENTS

| Number | Name | Date |
|---|---|---|
| 1,284,669 | Hang | Nov. 12, 1918 |
| 1,637,830 | Mannsdorff | Aug. 2, 1927 |
| 1,939,847 | Greist et al. | Dec. 19, 1933 |
| 2,041,111 | Brown | May 19, 1936 |
| 2,131,377 | Kohl | Sept. 27, 1938 |
| 2,619,139 | Riggle et al. | Nov. 25, 1952 |